United States Patent [19]

Tuff

[11] Patent Number: 5,020,372
[45] Date of Patent: Jun. 4, 1991

[54] PRESSURE MEASUREMENT DEVICES

[75] Inventor: Grant J. Tuff, Oxford, England

[73] Assignee: Rolls-Royce Motor Cars Limited, Cheshire, England

[21] Appl. No.: 463,034

[22] Filed: Jan. 10, 1990

[30] Foreign Application Priority Data

Jan. 10, 1989 [GB] United Kingdom ............... 8900465

[51] Int. Cl.$^5$ ........................... G01L 7/02; G01L 9/00
[52] U.S. Cl. .................................... 73/730; 73/754; 338/4
[58] Field of Search ........... 73/730, 753, 754, DIG. 4; 338/4

[56] References Cited

U.S. PATENT DOCUMENTS 3,603,152 9/1971 Alibert et al. .................... 73/730
3,898,885 8/1975 Russell ............................ 73/730

Primary Examiner—Donald O. Woodiel
Attorney, Agent, or Firm—Cushman, Darby & Cushman

[57] ABSTRACT

A pressure measurement device and method involves placing a load cell in a housing adjacent the pipe in which the pressure is to be measured. The housing includes a main block and clamping block. Pressure of the fluid in the pipe distorts the pipe and this distortion is detected by the load cell which produces a signal corresponding to that pressure.

9 Claims, 2 Drawing Sheets

PRESSURE MEASUREMENT DEVICES

BACKGROUND OF THE INVENTION

1. Field of the Invention

This invention relates to pressure measurement devices and particularly, but not exclusively, to pressure measurement devices for use on ducts which transmit fluids.

2. Description of the Related Art

Prior art methods of measuring the pressure within ducts have involved "breaking" the hydraulic system to insert a pressure gauge into the duct. However, as well as proving inconvenient and time consuming to achieve, this method also has associated disadvantages such as the risk of contaminating the hydraulic system. Prior art apparatus for detecting the pressure in a duct of a machine which is in use or of a vehicle that is 'on the road' comprises a special tapping block built into the hydraulic circuits at the point of interest. A pressure transducer fitted in the block would then be used to measure the pressure from within the car.

The present invention seeks to provide a solution to the aforementioned problems.

SUMMARY OF THE INVENTION

According to one aspect of the present invention there is provided a pressure measurement device comprising a housing adapted to accommodate a duct passing through said housing, and means located so as to be disposed in use adjacent the exterior wall of the duct for detecting distortion of the wall of the duct caused by pressure within the duct and operative to produce a signal representing that pressure.

The housing may comprise a main block and a clamping block, the latter being secured to the main block by any suitable securing means. A groove is provided in the connecting faces of each block such that when the two blocks are placed in face to face relation, the two grooves define a channel for a duct, the pressure within which is to be measured. The pressure within the duct may be detected by locating distortion detecting means such as a load cell which is housed in a recess in the main block adjacent the channel through which the duct will pass. A load applied to the load point of the load cell is transferred to the center of a diaphragm within the cell. This diaphragm distorts slightly due to the load. The distortion is in proportion to the applied load. Attached to the diaphragm are strain gauges which are stretched or compressed by the distortion. This change in length of the strain gauges changes their resistance. The change in resistance is measured by connecting the gauges in a wheatstone bridge circuit.

According to another aspect of the present invention, there is provided a method of detecting pressure within a duct, comprising the steps of transmitting fluid through the duct, measuring the distortion of the wall of the duct, and producing a signal which is dependent on the pressure in the duct.

The method of measuring the distortion of the duct may comprise the location of a distortion detecting means adjacent the exterior wall of the duct.

The device and method of the present invention are more convenient than those provided by the prior art. With the invention, there is no need to bleed the hydraulic system and the risk of contaminating the hydraulic system is correspondingly reduced. The present invention also allows pressure measurement within the duct while that duct is in service without disturbing the hydraulic system. The device of the invention has many applications and has particular application with hydraulic pipes of motor vehicles as the apparatus of the invention may be used to analyze the hydraulic system while the vehicle is 'on the road'.

In order that the invention may be more readily understood, a specific embodiment thereof will now be described, by way of example, with reference to the accompanying drawings.

DESCRIPTION OF THE PREFERRED EMBODIMENT

Figure 1:
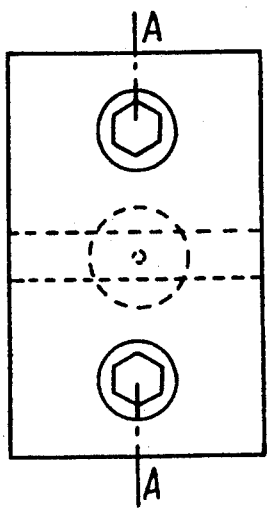
FIG. 1 is a side elevation of one embodiment of the invention.
Figure 2:
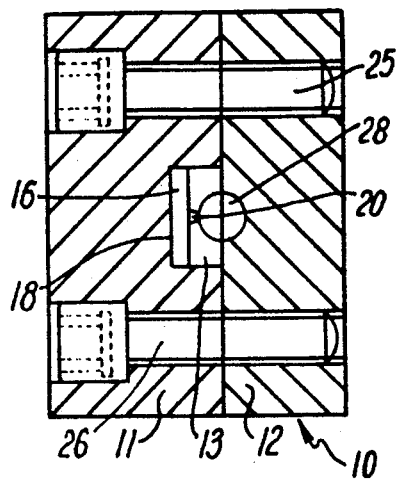
FIG. 2 is a cross-section along line A—A of FIG. 1.
Figure 3:
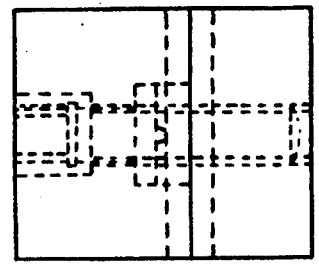
FIG. 3 is a plan view of the embodiment of FIG. 1.
Figure 4:
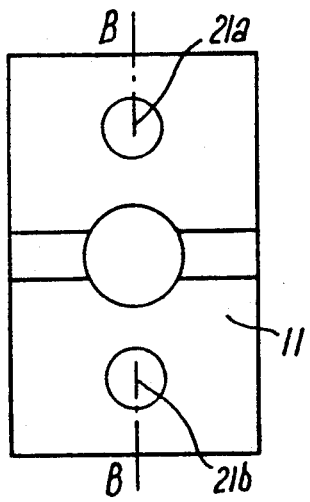
FIG. 4 is a side elevation of part of the housing of the embodiment of FIG. 1.
Figure 5:
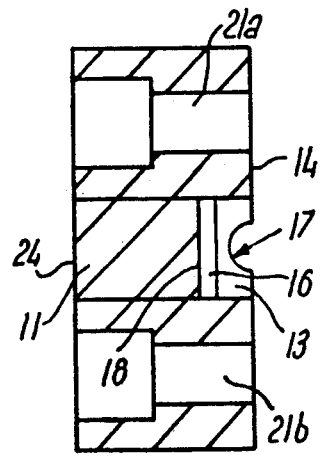
FIG. 5 is a cross-section along line B—B of FIG. 4.
Figure 6:
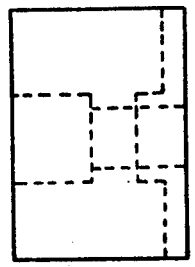
FIG. 6 is a plan view of the part of FIG. 4.
Figure 7:
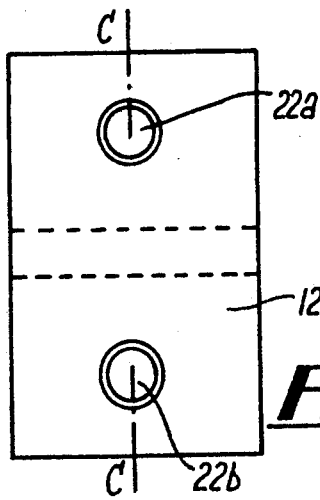
FIG. 7 is a side elevation of another part of the housing of the embodiment of FIG. 1.
Figure 8:
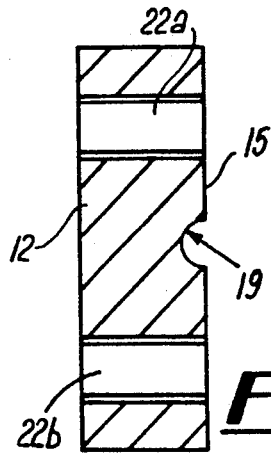
FIG. 8 is a cross-section along line C—C of FIG. 7.
Figure 9:
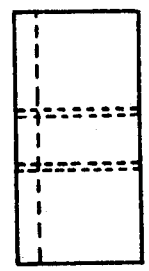
FIG. 9 is a plan view of the part of FIG. 7, and FIGS. 10 to 18 correspond respectively to FIGS. 1 to 9 and are corresponding view of a second embodiment of the invention.
Figure 10:
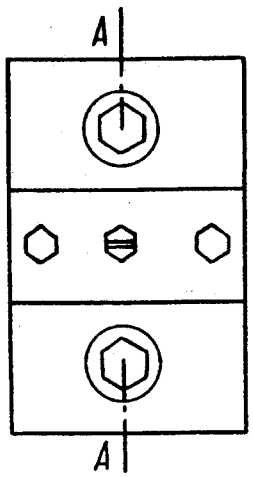
Figure 11:
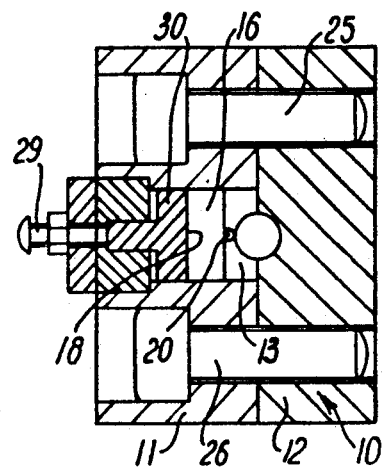
Figure 12:
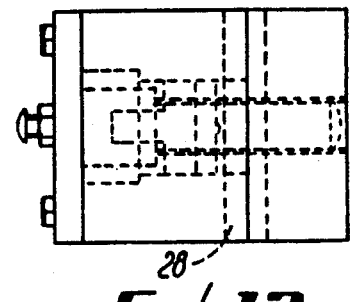
Figure 13:
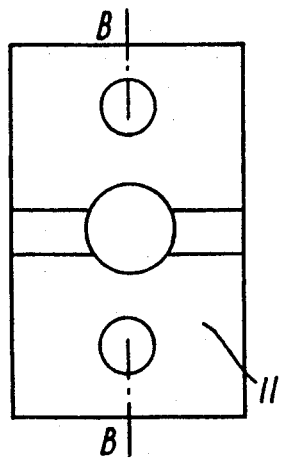
Figure 14:
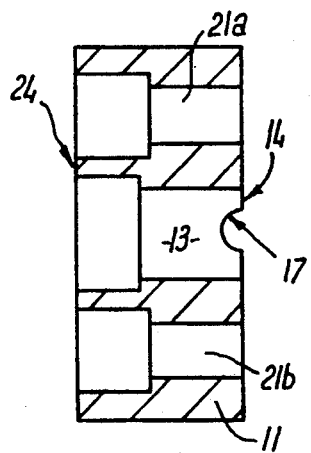
Figure 15:
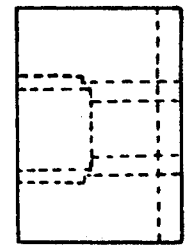
Figure 16:
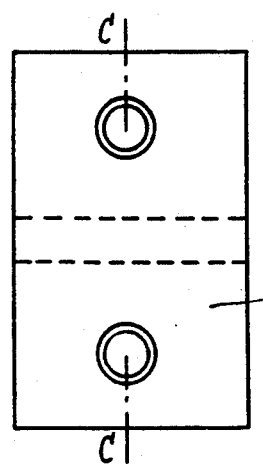
Figure 17:
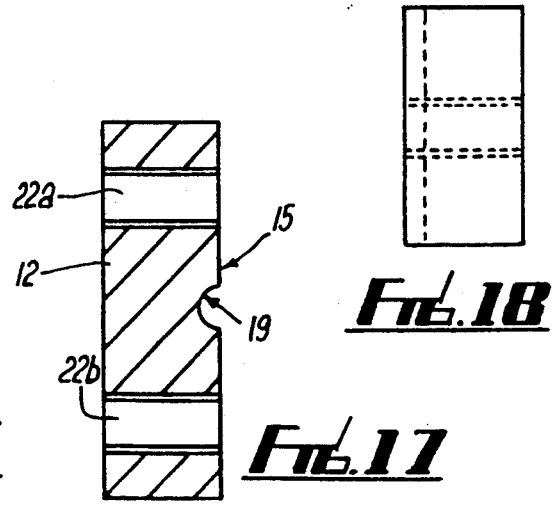
Figure 18:
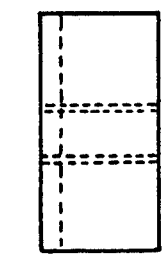

A pressure sensitive device comprises a housing 10 which may be manufactured from any suitable material such as steel. The housing 10 comprises a main block 11 and a clamping block 12. A recess 13 is provided in one face 14 of the main block 11. The dimensions of the recess 13 are such that they may receive a means for sensing distortion which may be lateral to a pipe located adjacent to the distortion detecting means. Although any distortion detecting means may be used, a load cell 16 is illustrated. The load cell 16 is located at the base 18 of the recess 13. In an alternative embodiment, the load cell position may be varied by means of adjustment screw 29 which controls the position of contra piston 30, thereby varying the size of recess 13. This modified arrangement is illustrated in FIGS. 10 to 18 wherein equivalent parts bear the same reference numerals as those of the first described embodiment. A contact 20 protrudes from the face of the load cell 16 which is remote from the base of the recess 13 at substantially ninety degrees to that face. Power means (not shown) such as a 5v dry cell are provided for the load cell 16 and a pressure display such as a digital meter (not shown) is also provided to display the measured pressure within the pipe. The digital display may be zeroed.

A groove 17 of semi-circular cross-section is provided in the face 14 of the main block 11. The groove 17 passes through the recess 13. The depth of the groove 17 is such that at least a part of the contact 20 extends above the base of the groove 17 when the groove 17 is viewed in cross-section. However, the part of the contact 20 which extends above the base of the groove must not be so large that on tightening the clamp the contact 20 is damaged. As shown in FIGS. 10 to 18, the position of contact 20 can be varied using the adjustment screw 29.

A groove 19 of semi-circular cross-section is also provided in one face 15 of the clamping block 12 such that when the face 14 of the main block 11 is placed in face to face relation with the face 15 of the clamping block 12, the semi-circular groove 17 in the main block and the semi-circular groove 19 of the clamping block in combination define a channel 28. It will be appreciated that the cross-sectional diameter of the channel 28 may be varied as required by altering the dimensions of the grooves 17, 19.

The main block 11 may be secured to the clamping block 12 by any suitable securing means. In this embodiment the securing means comprises bores 21a and 21b to receive clamping bolts 25 and 26. The bores 21a and 21b extend from face 24 to face 14 of the main block and two further bores 22a and 22b of similar dimension to the first bores 21a and 21b extend at substantially ninety degrees from the face 15 of the clamping block 12 into the clamping block 12. Clamping bolts 25 and 26 pass through the bores 21a and 21b of the main block and subsequently through the bores 22a and 22b of the clamping block. The clamping block 12 and the main block 11 may be secured to one another by tightening the clamping bolts 25 and 26 to a predetermined torque.

It will be appreciated that many types of securing means for securing the main block 11 to the clamping block 12 are suitable and the securing means of this embodiment of the invention is just one example from many possible securing means.

In practice, the device of the invention is calibrated prior to use. The groove 17 of the main block 11 is placed in register with a calibrated pipe or duct of known lateral dimension. The face 15 of the clamping block 12 is placed in register with the face 14 of the main block 11 such that the semi-circular groove 19 of the clamping block and the semi-circular groove 17 of the main block form a channel 28 around a portion of the calibration pipe. The main block 11 is secured to the clamping block 12 by tightening the clamping bolts 25 and 26 to a predetermined torque such that the contact 20 of the load cell is in contact with the pipe. The meter (not shown) to which the load cell 16 is connected is zeroed and a certain quantity of fluid is transmitted through the calibration pipe such that the pressure within the calibration pipe is known. The pressure of the fluid transmitted through the pipe exerts a force on the walls of the pipe, thus causing the walls of the pipe to expand. This expansion or distortion of the pipe is detected by the contact 20 of the load cell 16. The load cell 16, which may be supplied by a 5v dry cell or a flying lead from a vehicle battery, produces an electrical signal which corresponds to that certain pressure, the signal producing a reading on the meter. This process is repeated over a wide range of calibration pipe pressures. A calibration graph of digital reading on the meter versus the pressure within the pipe is prepared. The device can then be adapted to display the pressure within the pipe.

Once the device has been calibrated over the desired range of pressure, the apparatus may then be applied to a pipe, of similar lateral dimension to the calibration pipe, the pressure within which is required to be monitored. Slight variations in the lateral dimensions of the calibration pipe the and the pipe the within which the pressure is to be measured are taken account of as the main block 11 and clamping block 12 are connected together to a predetermined torque. An electrical zeroing device for the meter also takes these variations in lateral dimension into account.

It will be appreciated that the above embodiment has been described by way of example only and that many variations are possible without departing from the scope of the invention.

I claim:

1. A pressure measurement device comprising:
   a housing adapted to accommodate a duct passing through said housing, and
   means replaceably located in the housing so as to be disposed in use adjacent an exterior wall of the duct for directly detecting distortion of the wall of the duct caused by pressure within the duct and for producing a signal representing that pressure.

2. A pressure measurement device as claimed in claim 1, in which the housing comprises:
   a main block, and
   a clamping block secured to the main block.

3. A pressure measurement device as claimed in claim 2, in which a groove is provided in each block such that when the two blocks are placed in face to face relation, a channel is formed to accommodate the duct, the pressure within which is to be measured.

4. A pressure measurement device as claimed in claim 1 in which the means for detecting distortion are disposed in a recess formed in the housing.

5. A pressure measurement device as claimed in claim 4, in which means are provided for varying the size of the recess to enable the position of the means for detecting to be varied.

6. A pressure measurement device as claimed in claim 5, in which the means for varying the size of the recess comprises:
   a movable piston, and
   means for adjusting the position of the piston within the recess.

7. A pressure measurement device as claimed in claim 1 in which the means for detecting comprises a load cell.

8. A pressure measurement device as claimed in claim 7, in which the load cell is electrically connected to a wheatstone bridge circuit.

9. A method of detecting pressure within a duct comprising the steps of:
   transmitting fluid through the duct,
   directly measuring the distortion of a wall of the duct by replaceably locating a distortion detection means adjacent the wall of the duct, and
   producing a signal which is dependent on the pressure in the duct.

* * * * *